United States Patent [19]

Heinz

[11] Patent Number: 4,831,443
[45] Date of Patent: May 16, 1989

[54] WIDE BAND VCR WITH COMB FILTER INHIBITION

[75] Inventor: Steven J. Heinz, Wheeling, Ill.

[73] Assignee: Zenith Electronics Corporation, Glenview, Ill.

[21] Appl. No.: 94,221

[22] Filed: Sep. 8, 1987

[51] Int. Cl.[4] .............................................. H04N 7/04
[52] U.S. Cl. ...................................... 358/147; 358/31
[58] Field of Search ............... 358/21 R, 31, 145, 147, 358/310, 329

[56] References Cited

U.S. PATENT DOCUMENTS 4,695,900 9/1987 Honjo et al. ........................ 358/310

Primary Examiner—James B. Mullins

[57] ABSTRACT

A super VHS VCR includes a comb filter for separating luminance and chrominance signals from a composite video signal to provide improved frequency recording characteristics. A timing circuit detects the television signal vertical interval, finds the horizontal lines that bear encoded Teletext data and inhibits comb filtering during the active video portions of the selected horizontal lines to protect any Teletext data from corruption by the comb filter action.

9 Claims, 4 Drawing Sheets

WIDE BAND VCR WITH COMB FILTER INHIBITION

This invention relates generally to data transmission in television signal processing apparatus and specifically to systems wherein Teletext or other encoded data is included in the vertical interval of a television signal that is subject to processing by comb type time domain filters. More specifically, the invention is directed to wide band video recorders having a comb filter for producing separate output signals.

BACKGROUND OF THE INVENTION AND PRIOR ART

As is well known, NTSC color television signals have interleaved luminance and chrominance information that is separable by use of bandpass filters and the like. Decoding of the interleaved chrominance and luminance information to produce R, G and B signals introduces crosstalk between the chrominance and luminance information that limits the quality of the resultant display. Processing of the combined signals by means of conventional bandpass filters has also generally limited the bandwidth of the recovered signals. More expensive comb type filters have not been used extensively in receivers, although some performance improvement is obtainable.

Conventional video cassette recorders (VCRs) have a limited frequency response (about 2 MHz) due to the characteristics of the carrier frequency used to modulate the luminance information for recording. This limitation has effectively precluded use of conventional VCRs to record Teletext information, which comprises encoded data transmitted on selected horizontal lines in the vertical blanking interval of the television signal.

Recent improvements in the frequency characteristics of recording machines resulted in a so-called super VHS VCR having a bandwidth of about 4 MHz. This wide band VCR is equipped with separate luminance (Y) and chrominance (C) signal inputs as well as a composite (mixed Y and C) video input. Signals that are developed and maintained in separate luminance and chrominance form may be recorded and played back with much improved fidelity. Such VCRs incorporate comb filters, for processing both composite video signals and separate Y and C signals, with little restriction on bandwidth. Thus the luminance signal can have a full 4 MHz bandwidth with a super VHS VCR. The separate Y signal may even be comb filtered in the VCR to remove interference.

The large bandwidth capability of wide band VCRs implies the possibility of recording Teletext data, which as mentioned, has not been possible with conventional VCRs. The use of time domain filters of the comb type, however, corrupts the Teletext data because of the alternate horizontal line additions and subtractions performed in the comb filtering process.

The present invention broadly covers a video processing system for television signals bearing Teletext data on horizontal lines that are subject to processing by comb filters and has specific application to wide band VCRs.

OBJECTS OF THE INVENTION

A principle object of the invention is to provide an improved video processing system.

A further object of the invention is to provide a wide band VCR that is capable of recording Teletext information.

Another object of the invention is to provide a television signal information transmission system that utilizes the benefits of comb filtering while avoiding its drawbacks.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
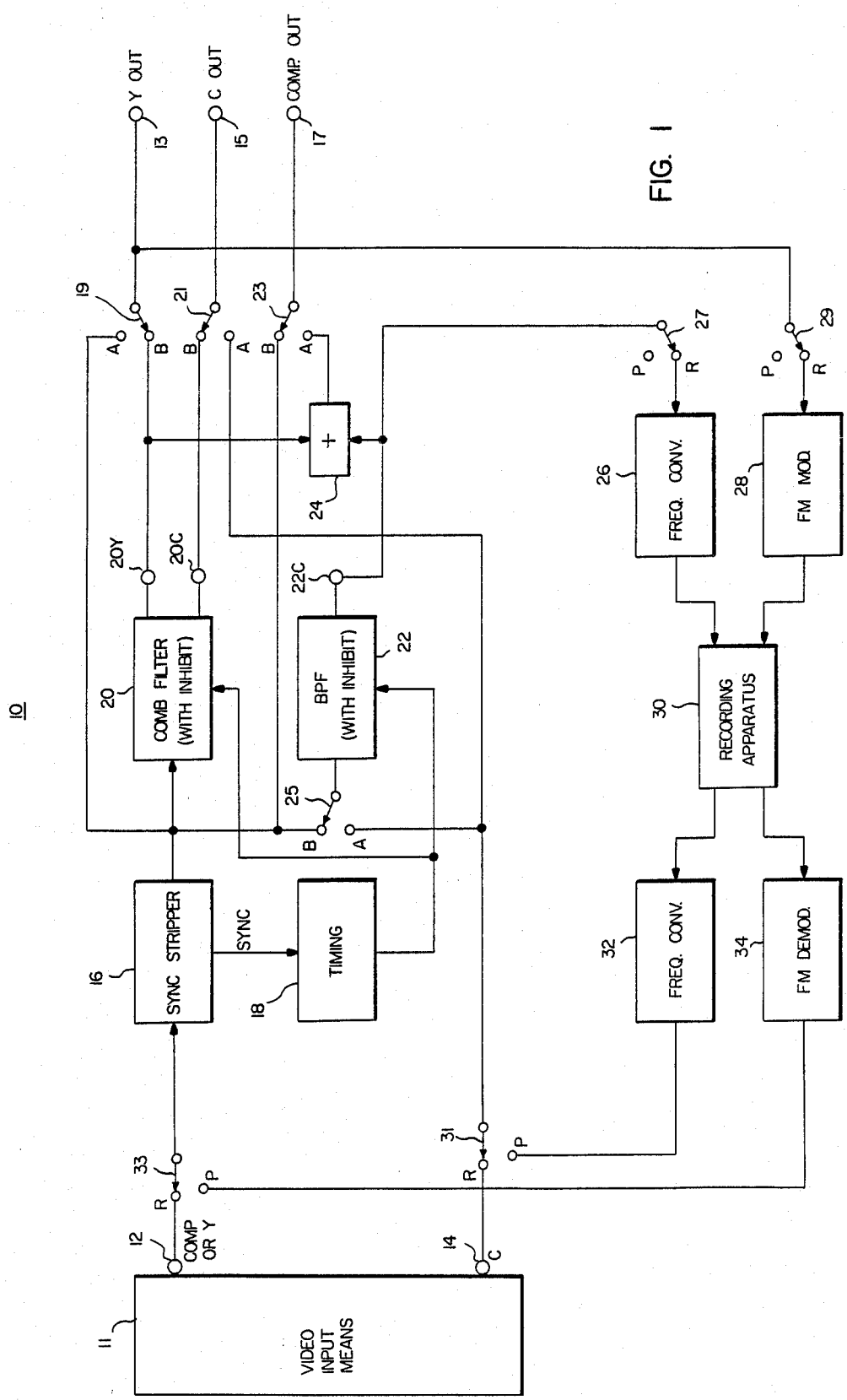
FIG. 1 is a block diagram of a super VHS VCR constructed in accordance with the invention.

Referring to FIG. 1, a VCR, generally designated by reference numeral 10, is supplied with a source of signals by video input means 11. These signals may comprise a composite video signal at a terminal 12 or, alternatively, a Y luminance signal at terminal 12 and a C chrominance signal at a terminal 14. The composite video signal consists of interleaved chrominance and luminance components and synchronizing components whereas the separate Y signal includes only the monochrome video and synchronizing components. The chrominance signal consists of only color information which includes a color burst. Terminal 12 constitutes an input of the VCR and is internally connected to the Record (R) terminal of a switch 33 and form switch 33 to a sync stripper 16 which supplies synchronizing signals to a timing circuit 18 and either the composite video signal or the separate Y signal to a comb filter means 20. Comb filter means 20 has two outputs, 20Y and 20C at which the separated monochrome and color signals, respectively, appear. The terminal 20Y of comb filter means 20 is connected to terminal B of a switch 19 and to one input of an adder circuit 24. The 20C terminal is connected to terminal B of a switch 21. The video signal output from sync stripper 16 is also coupled to terminal A of switch 19 and to the B terminals of a switch 23 and a switch 25. Terminal 14 of VCR 10 is connected to the R terminal of a switch 31. Switch 31 is connected to the A terminals of switch 21 and of switch 25.

Switches 27, 29, 31 and 33 are used for recording and playback of video signals. Switches 19, 21, 23 and 25 are positioned in accordance with the input source material received by the VCR, with terminals A representing the separate Y and C position and terminals B representing the composite video position. The common terminals of switches 19, 21 and 23 are coupled to VCR output terminals 13, 15 and 17 and provide a Y signal output, a C signal output and a composite signal output, respectively. The common terminal of switch 19 is also connected to switch 29. The common terminal of switch 25 is connected to a bandpass filter means 22 having an output terminal 22C. Terminal 22C is connected to the other input of adder circuit 24 and to the common terminal of switch 27. When switches 27 and 29 are in the R positions, signals are coupled to a frequency converter 26 and to an FM modulator 28, respectively. These elements, in turn, supply appropriate signals to recording apparatus 30 for recording the monochrome and color information onto tape.

For playback, recording apparatus 30 has a pair of outputs that supply a frequency converter 32 and an FM demodulator 34. The signal output of frequency converter 32 is coupled to the Playback (P) terminal of switch 31 and the signal output of FM demodulator 34 is coupled to the P terminal of switch 33. The switches 27, 29, 31 and 33 are shown in the R positions and the VCR is thus in its recording mode. Finally, timing circuit 18 is connected to comb filter means 20 and to bandpass filter means 22 for the purpose of activating inhibit circuits therein for effectively disabling the combing action and the color channel in accordance with an inhibiting signal, as will be explained.

Figure 2:
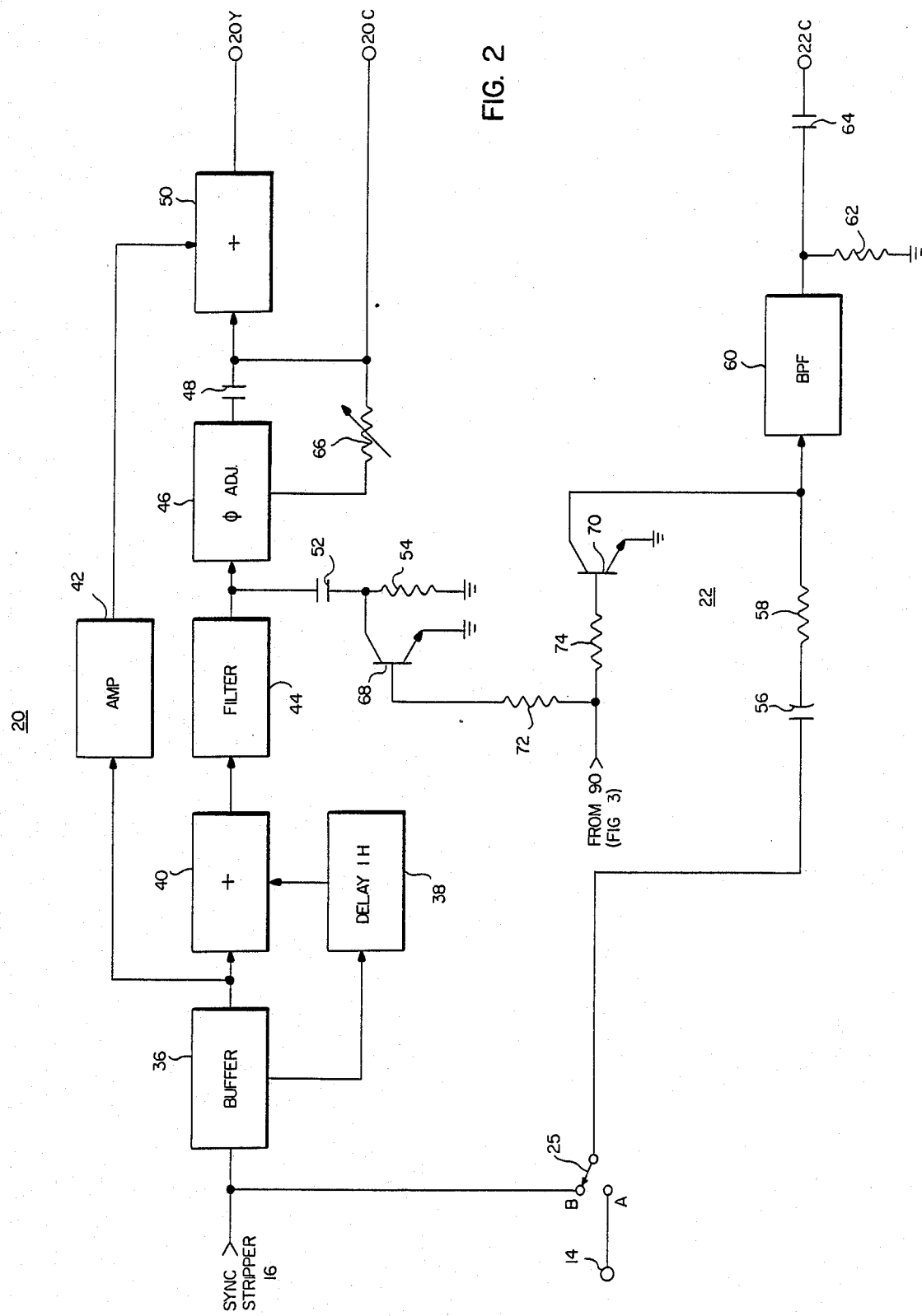
FIG. 2 is a partial block, partial schematic diagram of the comb filter and color path of the VCR of FIG. 1 with the comb filter inhibit circuit of the invention.

In FIG. 2, the comb filter means 20 and bandpass filter means 22 of FIG. 1 are illustrated in detail. The output of sync stripper 16 is connected to a buffer amplifier 36 and to the B terminal of switch 25. The output of buffer 36 is supplied to an adder circuit 40 directly and also through a delay circuit 38. Delay circuit 38 functions to delay the video information by one horizontal line and also to invert the information. The output of adder circuit 40 is supplied, through a filter 44 to produce the color signal, then to a phase adjustment circuit 46, which produces opposite polarity outputs. The output of buffer 36 is also supplied to an amplifier 42 that directly supplies the input of another adder circuit 50. Phase adjustment circuit 46 supplies signals that are oppositely phased with respect to the output of amplifier 42 to adder circuit 50. One output is coupled through a capacitor 48 and the other through an adjustable resistor 6 for enabling a fine phase adjustment, with both being combined at the input of adder 50. The output of phase adjustment circuit 46 is also applied to terminal 20C. The output of adder 50 is supplied to terminal 20Y.

The common terminal of switch 25 is connected through a capacitor 56 and a series resistor 58 to a bandpass filter 60, the output of which is supplied through a capacitor 64 to terminal 22C. The output of bandpass filter 60 is also connected to ground through a resistor 62.

Inhibition of comb filter means 20 and bandpass filter means 22 is provided by a pair of NPN-type inhibiting transistors 68 and 70. Transistor 68 has its collector connected to the junction of a capacitor 52 and a ground resistor 54 and its emitter connected to ground. Capacitor 52 is connected between filter 44 and phase adjustment circuit 46. When the base of transistor 68 is supplied through a resistor 72 with an appropriate inhibit signal, transistor 68 conducts and effectively grounds the output of filter 44. The inhibit signal is supplied from a transistor 90 (FIG. 3) and is also applied through a resistor 74 to the base of inhibiting transistor 70. Transistor 70 has its emitter connected to ground and its collector connected to the junction of resistor 58 and bandpass filter 60. When transistor 70 conducts, it shorts the input of bandpass filter 60 and kills the color signal on terminal 22C. As will be seen when the circuit operation is described, the duty cycle of the inhibit signal is such that the filters are inhibited only during the active video portions of the selected horizontal lines.

Figure 3:
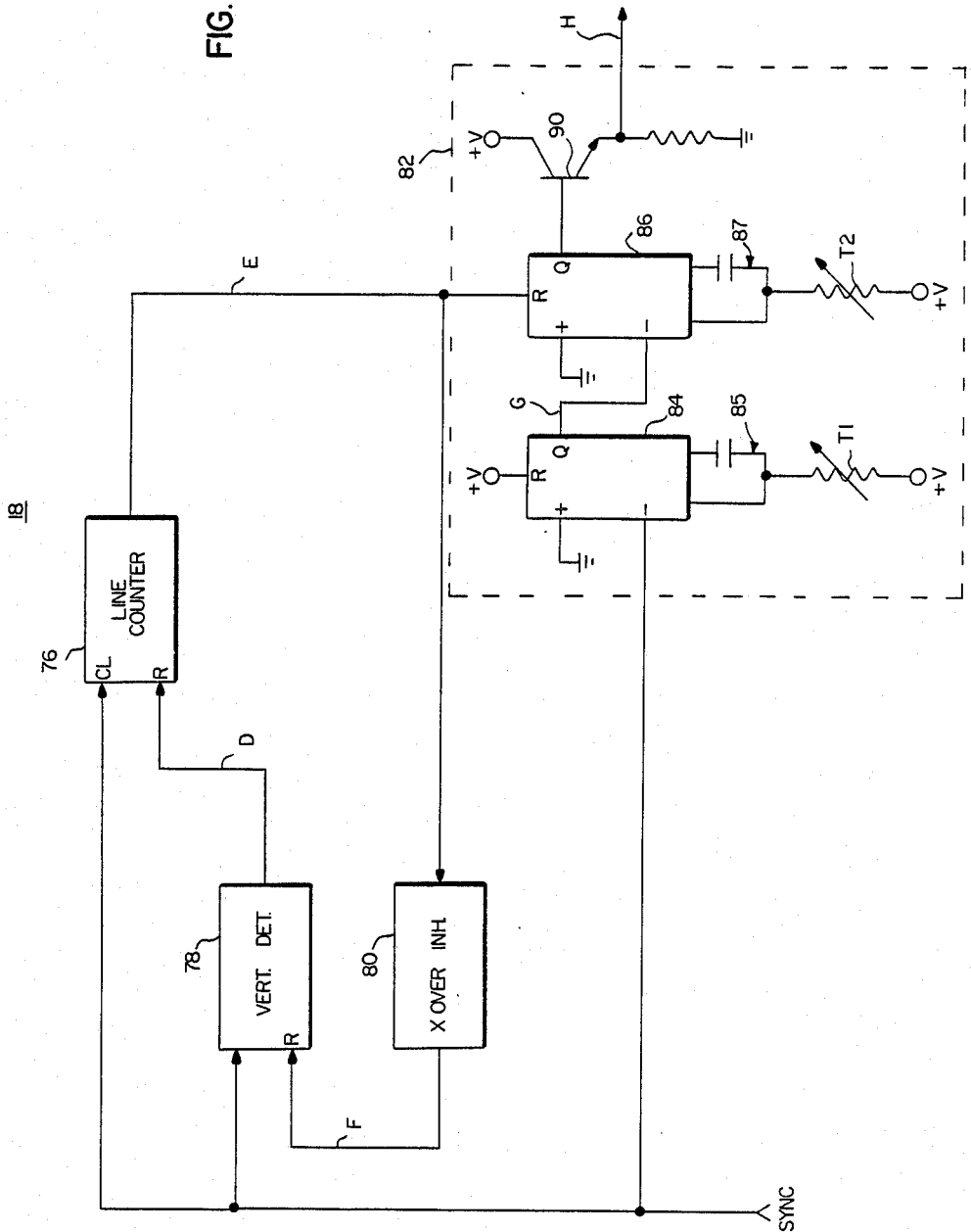
FIG. 3 is a diagram illustrating the timing circuit of FIG. 1.

In FIG. 3, timing circuit 18 is shown with the sync signal being negative going. The sync signal input to timing circuit 18 is applied to the CL input of a line counter 76, to the input terminal of a vertical detection circuit 78 and to the (−) or negative edge trigger input of a monostable multivibrator 84. The output of a crossover inhibit circuit 80 is connected to the reset (R) input of vertical detector 78 and vertical detector 78 supplies the reset input of line counter 76. The output of line counter 76 is connected to the input of crossover inhibit circuit 80 and to the reset terminal of a monostable multivibrator 86. Multivibrators 84 and 86 are interconnected to form a duty cycle circuit 82 which develops the appropriate duty cycle for the inhibit signal that operates the inhibiting transistors 68 and 70.

Multivibrator 84 is connected to a +V voltage source through a variable resistor and a capacitor that form a timing network 85 for generating about a 9 microsecond delay (T1). The Q output of multivibrator 84 is connected to the (−) or negative edge trigger input of monostable multivibrator 86 which is also connected to a +V source through a variable resistor and capacitor timing network 87. This latter timing network produces a delay of about 53 microseconds (T2). The Q output of multivibrator 86 is connected to the base of transistor 90 which has its collector connected to +V and its emitter connected to ground through a resistor 91. The inhibit signal, which is produced at the sync signal rate, but only during the selected horizontal lines, has a duty cycle selected to inhibit the active video portion of the horizontal line, but not the sync portion. This precludes blanking out of sync and color burst information and VIR (vertical interval reference) signals, if present. The 9 microsecond delay yields the T1 portions of the inhibiting signal and the 53 microsecond delay yields the T2 portion.

It will be noted that systems are contemplated wherein data is included on lines that are not in the vertical blanking interval. The invention is equally useful in such systems, with the selected lines (or line portions), i.e., those carrying the data, being treated as discussed above.

Figure 4:
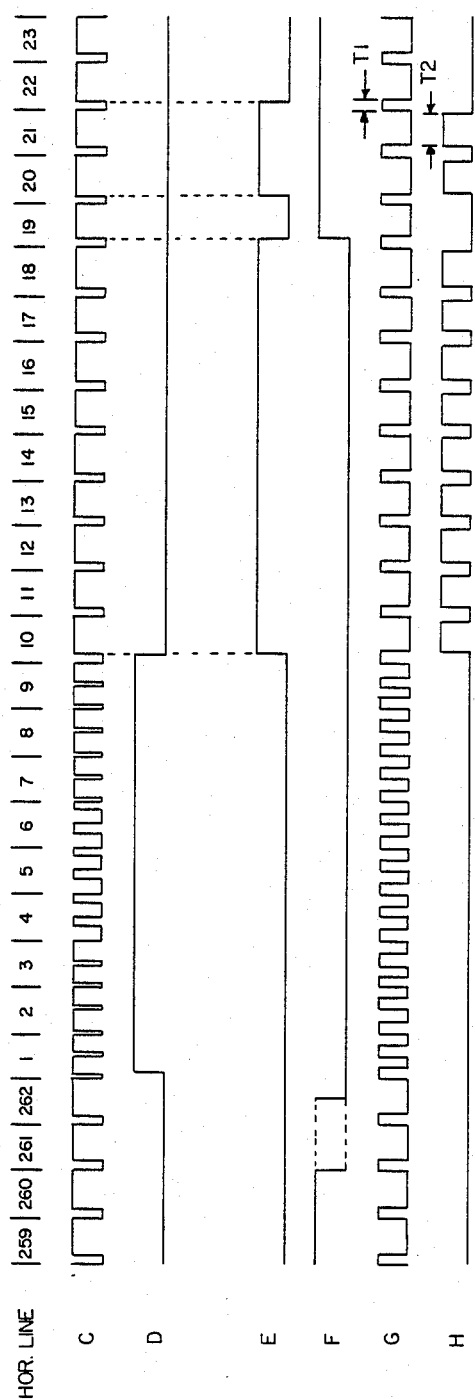
FIG. 4 is a series of waveforms explaining operation of the timing circuit of FIG. 3.

In FIG. 3, waveforms C, D, E, G and H are indicated at appropriate points. In FIG. 4, these waveforms are shown in time coincidence with an upper waveform that identifies, by number, a group of horizontal lines in a television signal. Specifically, the waveform indicates the portion of one field of the television signal extending from horizontal lines 259 through horizontal line 23. Thus the waveforms cover the beginning of the vertical blanking interval of a television signal. Waveform C represents the synchronizing signal input to timing circuit 18, waveform D the output of vertical detector 78, waveform E the output of line counter 76, waveform F the output of crossover inhibit circuit 80, waveform G the Q output of monostable multivibrator 84 and waveform H the output from transistor 90, which latter output comprises the inhibiting signal.

Referring back to FIG. 2, operation of the comb filter means 20 will generally be described. The composite video signal (luminance and chrominance) supplied to buffer 36 is applied to an adder 40 both directly and after being delayed and inverted by one line. With this arrangement, the interleaved luminance and chrominance components in the composite video signal are separated with the resultant color information (and some luminance information) appearing at the output of adder 40. This information is further filtered to remove the luminance by means of filter 44 and applied via a phase adjustment circuit 46 to adder 50. The composite video signal is also applied through amplifier 42 to adder 50 where combing action again occurs with the recovered chrominance signal being added in opposite phase to cancel the interleaved chrominance, which results in the Y signal appearing at the output of adder 50. The chrominance signal applied to phase adjustment circuit 46 appears at terminal C. When inhibiting transistor 68 is in conduction, the output of filter 44 is connected to ground which effectively shunts out the chrominance signal developed in adder 40. Since no separated chrominance signal is available at adder 50 for combing with the original composite video signal applied to adder 50, the composite video signal appears at terminal 20Y in an unmodified state.

Similarly, the composite video signal applied to color bandpass filter means 22 results in chrominance information being applied to terminal 22C. Upon activation of inhibiting transistor 70, however, the chrominance signal is shunted to ground and no chrominance signal appears at terminal 22C. (It will be recalled that terminal 22C provides the recording input to the color channel of the VCR.)

Referring back to FIG. 1, general operation of the video system will be described. Assume that a separate Y and C signal input is being received for recording. Switches 19, 21, 23 and 25 occupy the A positions and switches 27, 29, 31 and 33 occupy the R positions. Sync stripper 16 conveys the input Y signal to comb filter 20 and provides sync pulses to timing circuit 18. The Y signal is combed and appears at terminal 20Y which is connected to one input of adder 24. The separate C signal from terminal 14 is passed through bandpass filter means 22 and appears at terminal 22C where it is applied to switch 27 for recording, to VCR terminal 15 via switch 21 and to the other input of adder 24. The output of adder 24 provides a composite video output signal (with luminance and chrominance interleaved) to VCR output terminal 17. The Y signal input is bypassed around comb filter means 20 to terminal A of switch 19, where it appears at the Y signal output terminal 13 of the VCR. The Y signal is also applied to switch 29 for recording. Thus the Y and C signals which were separate, that is, not interleaved, are retained in their separate conditions, i.e., not subjected to any processing that would tend to create interference between the Y and C signals, for recording. Thus far, the operation is standard with a super VHS recorder except for the effects of the timing circuit, which will be discussed below.

Assume a composite video signal is being received. Switches 19, 21, 23 and 25 are in the B positions as shown and switches 27, 29, 31 and 33 in the R positions as shown. Input terminal 14 receives no signal. The composite video signal at input terminal 12 is applied to sync stripper 16 and the sync signals applied to timing circuit 18. Sync stripper 16 supplies composite video to comb filter means 20 and to bandpass filter means 22. Comb filter means 20 operates to separate the luminance and chrominance signals, which are supplied to terminals 20Y and 20C, respectively. These signals are supplied to Y output terminal 13 and C output terminal 15, via switches 19 and 21, respectively. The Y signal is also applied to switch 29 for recording. The composite video signal applied to bandpass filter means 22 results in the chrominance information being coupled via terminal 22C to switch 27 for recording. Operation is again standard with the comb filtering improving the quality of the recorded television signal.

Assume now that Teletext information is transmitted on lines 10-18, 20 and 21 in the vertical interval. That Teletext information will be corrupted by the action of the comb filter means 20 in separating the luminance and chrominance information. Vertical detector circuit 78 (FIG. 3) detects the beginning of the vertical interval. Waveform D (FIG. 4) indicates this event by the change from a low level to a high level. Line counter 76 delivers an output when waveform D again goes low and counts lines at the positive edge of every horizontal pulse. This event is indicated by waveform E going from a low level to a high level. As long as the output from line counter 76 is at a high level, the sync pulses (waveform C) applied to duty cycle circuit 82 are effective. Note that line counter 76 goes low at the end of line 18 and stays low until the beginning of line 20. It goes low again at the end of line 21. Therefore, the duty cycle circuit 82 is active during lines 10-18, 20 and 21.

The crossover inhibit circuit 80 precludes the head switching in the VCR from disrupting the system by giving a false indication of the beginning of the vertical interval. The crossover inhibit circuit is a monostable that has a long timeout period and enables vertical detector circuit 78 only after occurrence of lines 261 or 262, indicated by the overlapped dotted line portions of waveform F. As mentioned, the monostable multivibrators 84 and 86 operate together to provide an inhibit signal waveform (H) that activates the inhibiting transistors 68 and 70 only during active video portions of the horizontal lines 10-18 and 20 and 21. This permits sync, color burst and VIR signals, if present, to pass.

The crossover inhibit circuit, which forms no part of the present invention, may be obviated by use of a different vertical detector. Similarly, the specific line counting arrangement shown is not to be considered limiting as to the invention.

Referring back to FIG. 2, the incoming composite video signal is processed by comb filter means 20 except when inhibiting transistor 68 is conductive, that is except during the active video portions of lines 10-20 and 21. During those portions when the Teletext data may be present, the comb filter means 20 is disabled and the composite video signal, applied through amplifier 42, appears at terminal 20Y. This terminal is connected to the FM modulator 28 and enables recording of Teletext data by recording apparatus 30. At the same time, timing circuit 18 inhibits the bandpass filter means 22 to prevent a color signal from being applied to terminal 22C. While there is no color signal during the vertical interval, the Teletext information does pass through and it is necessary to prevent it from adding with the Y signal when producing composite video during playback. Thus the Teletext data is not corrupted since the selected horizontal lines containing it are not subjected to comb processing.

Under playback conditions, switches 19, 21, 23 and 25 are in the A positions and switches 27, 29, 31 and 33 in the P positions (FIG. 1). The input signals to sync stripper 16 are applied from FM demodulator 34 and the input signal to bandpass filter 22 is from frequency converter 32. The Y signal from sync stripper 16 is bypassed to terminal A of switch 19 to provide a separate Y output at terminal 13 and is also applied to comb filter means 20 and appears at terminal 20Y. This signal is supplied to adder 24 where it is combined with the output of bandpass filter means 22 and applied through switch 23 to the composite output terminal 17 of the VCR. The C signal from frequency converter 32 is applied to terminal A of switch 25, feeding the input of bandpass filter means 22, and to terminal A of switch 21 which feeds the C output terminal 15 of the VCR. It is obviously important that the recorded data in the selected horizontal lines of the vertical interval not be corrupted by being subjected to comb filtering since that data may be applied to a television receiver equipped with a Teletext decoder for viewing. Thus the timing circuit inhibits comb filtering, as before, during the selected horizontal lines of the vertical interval where the Teletext data appears. The Y signal applied to comb filter means 20 is directly coupled through amplifier 42 (FIG. 2) and adder 50 to terminal 20Y.

With the invention, the Teletext data in a television receiver may be recorded by a super VHS or other wide band VCR without being corrupted by action of comb filters included in such wide band apparatus. The invention is readily applied to super VHS VCRs and involves the relatively simple and low cost addition of a timing circuit and switching transistors. It is recognized that the invention is not to be limited to use with VCRs but is applicable to any television signal having data carried by selected lines of the vertical interval, which signal is subject to comb processing that would otherwise tend to corrupt the data. The invention is to be limited only as defined in the claims.

What is claimed is:

1. In combination in a video system:
    means supplying a television signal having encoded data on one or more horizontal lines;
    time domain filter processing means of the comb type for receiving said television signal and, in response thereto, developing at least first and second signal components respectively reflecting video information from successive horizontal lines, and including means for combining said first and second signal components to provide a processed output signal; and
    means for inhibiting one of said first and second signal components during the occurrence of said encoded data.

2. The combination of claim 1 wherein said encoded data is Teletext data on selected horizontal lines in the vertical interval of said television signal and further including;
    line counting means for enabling said inhibiting means during said selected horizontal lines.

3. The combination of claim 2 wherein said selected horizontal lines include active video portions and synchronizing portions and wherein said inhibiting means is enabled only during said active video portions.

4. A VCR comprising:
    input means for receiving a color television signal having horizontal lines and a vertical interval, said horizontal lines including active video portions and synchronizing portions, said television signal having encoded Teletext data on selected horizontal lines in said vertical interval;
    comb filter means receiving said color television signal and, in response thereto, developing first and second signal components respectively reflecting video information from successive horizontal lines and including means for combining said first and second components to provide a processed output signal; and
    means responsive to said synchronizing portions for inhibiting one of said first and second components during said selected horizontal lines.

5. The VCR of claim 4 wherein said inhibiting means include:
    line counting means responsive to said synchronizing portions for developing an inhibit signal corresponding to said selected horizontal lines 6. The VCR of claim 5 wherein said inhibiting means further include:
    vertical interval detection means for detecting said vertical interval coupled to said line counting means; and
    duty cycle means coupled to said line counting means for controlling generation of said inhibit signal only during said active video portions of said selected horizontal lines.

7. The VCR of claim 6 wherein said duty cycle means include a pair of monostable multivibrators and a transistor for generating said inhibit signal during active video portions of said selected horizontal lines.

8. The VCR of claim 7 wherein said inhibit signal is developed on horizontal line numbers 10–18, 20 and 21.

9. A method for processing a composite television signal comprising the steps of:
    providing a continuous composite television signal;
    generating a first signal having no video content during the active video portions of selected horizontal lines of said composite television signal and otherwise reflecting the chroma content thereof; and
    subtracting the first signal from the composite signal to provide a processed signal.

* * * * *